Nov. 20, 1945.  A. R. THOMPSON  2,389,330
VALVE MECHANISM FOR PRESSURE COOKERS
Filed April 20, 1942   5 Sheets-Sheet 1
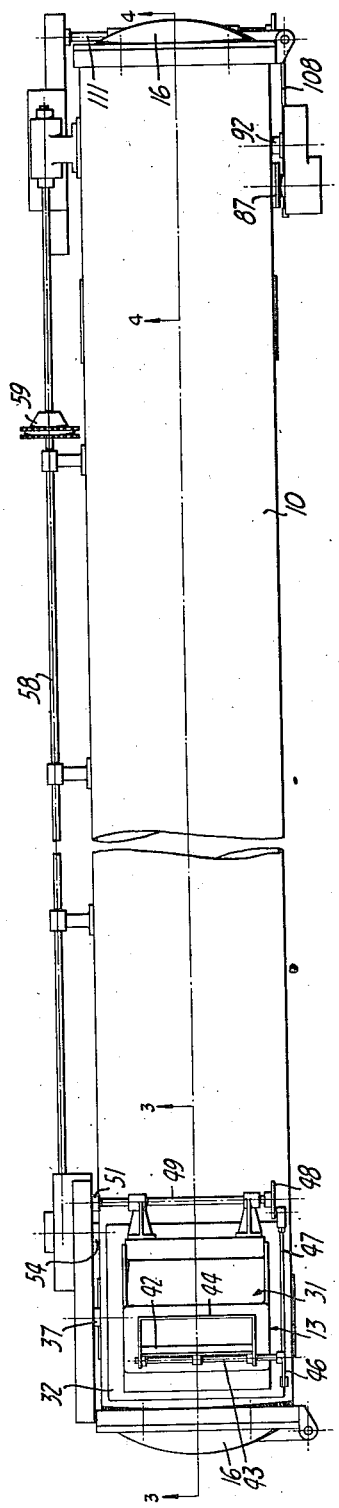
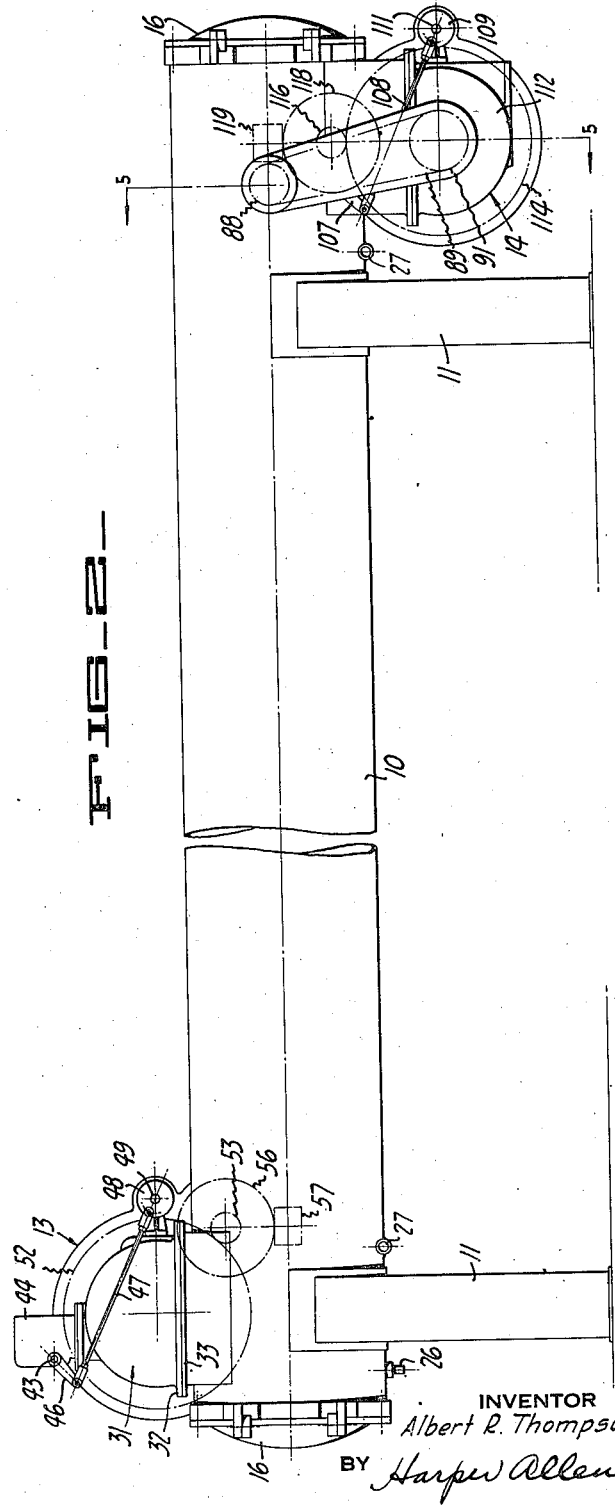
INVENTOR
Albert R. Thompson
BY Harper Allen
ATTORNEY Nov. 20, 1945.    A. R. THOMPSON    2,389,330
VALVE MECHANISM FOR PRESSURE COOKERS
Filed April 20, 1942    5 Sheets-Sheet 2
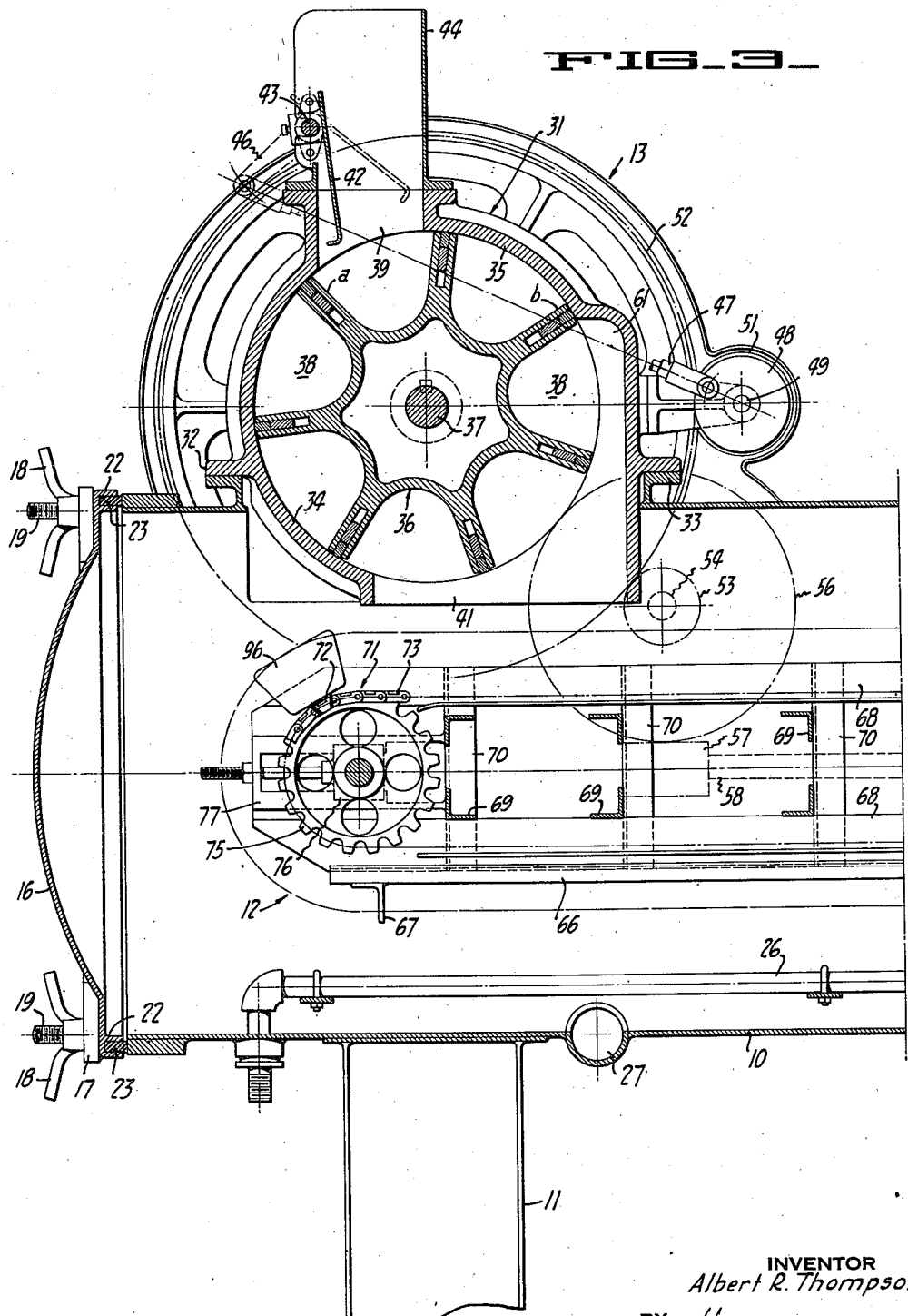
FIG_3_
INVENTOR
Albert R. Thompson
BY Harper Allen
ATTORNEY

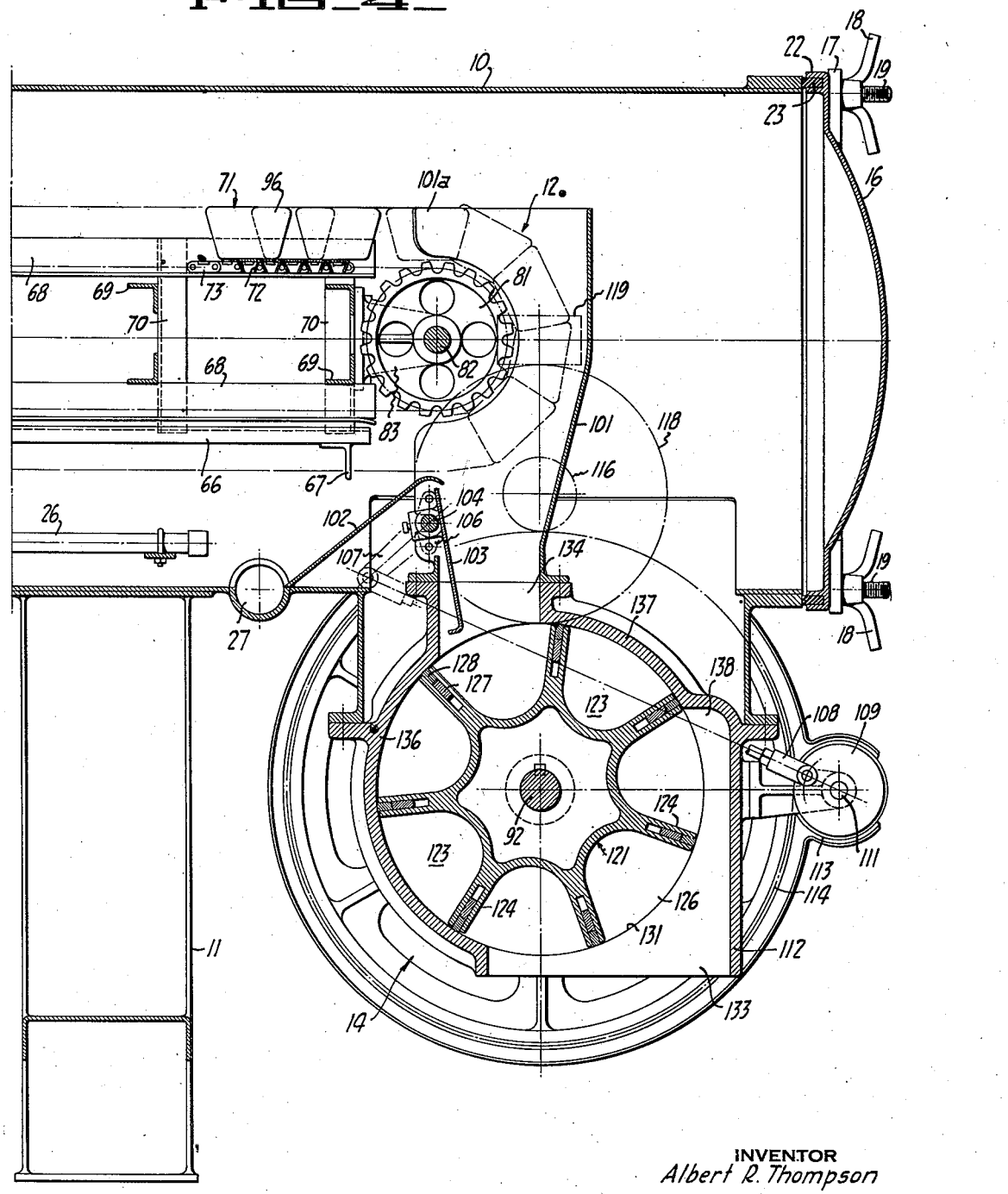

Nov. 20, 1945.   A. R. THOMPSON   2,389,330
VALVE MECHANISM FOR PRESSURE COOKERS
Filed April 20, 1942   5 Sheets-Sheet 4
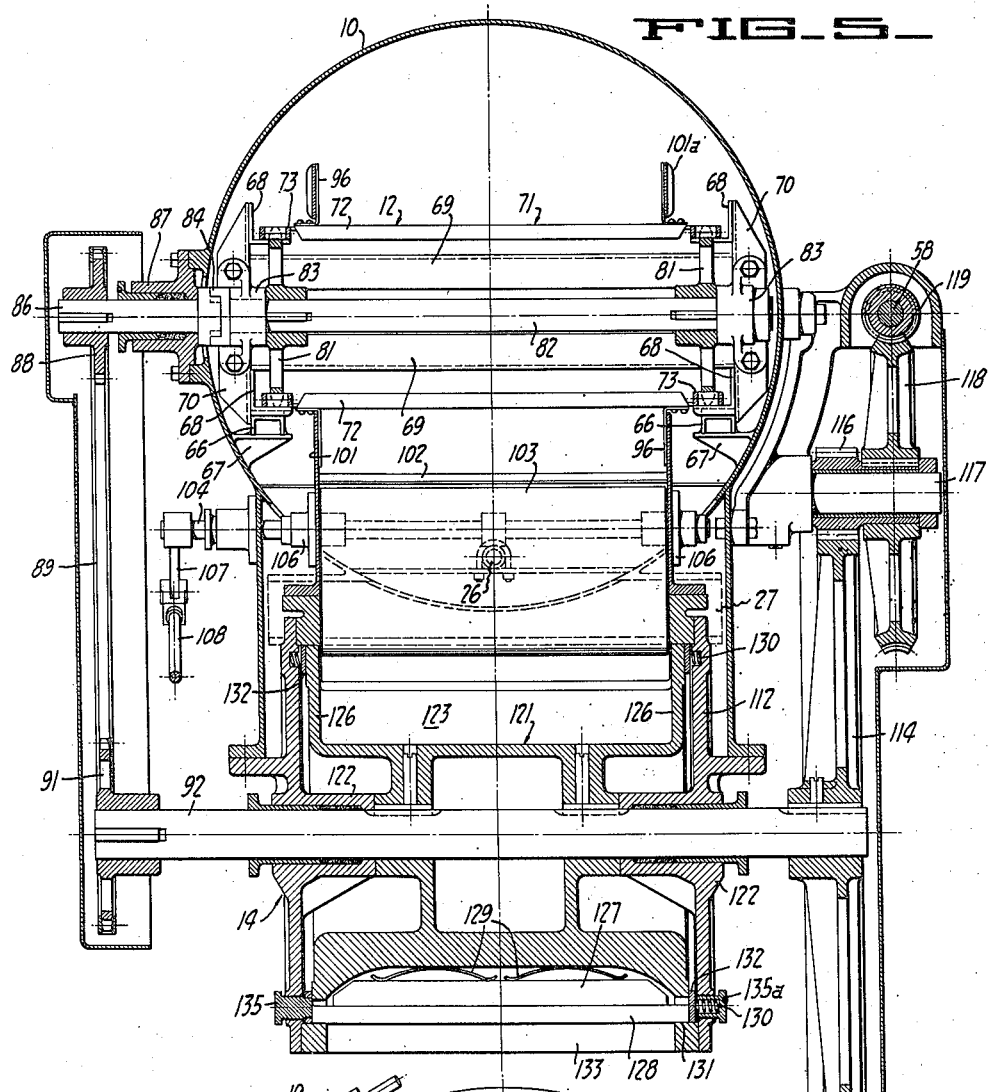
FIG_5_
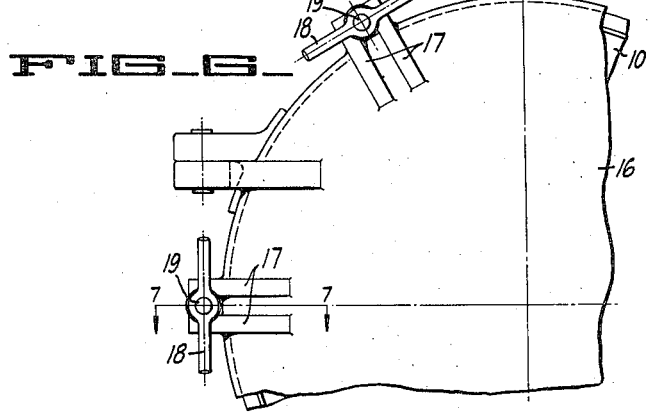
FIG_6_
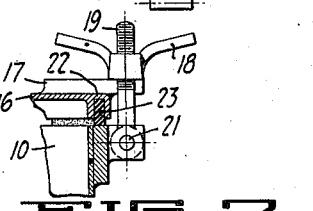
FIG_7_
INVENTOR
Albert R. Thompson
BY Harper Allen
ATTORNEY

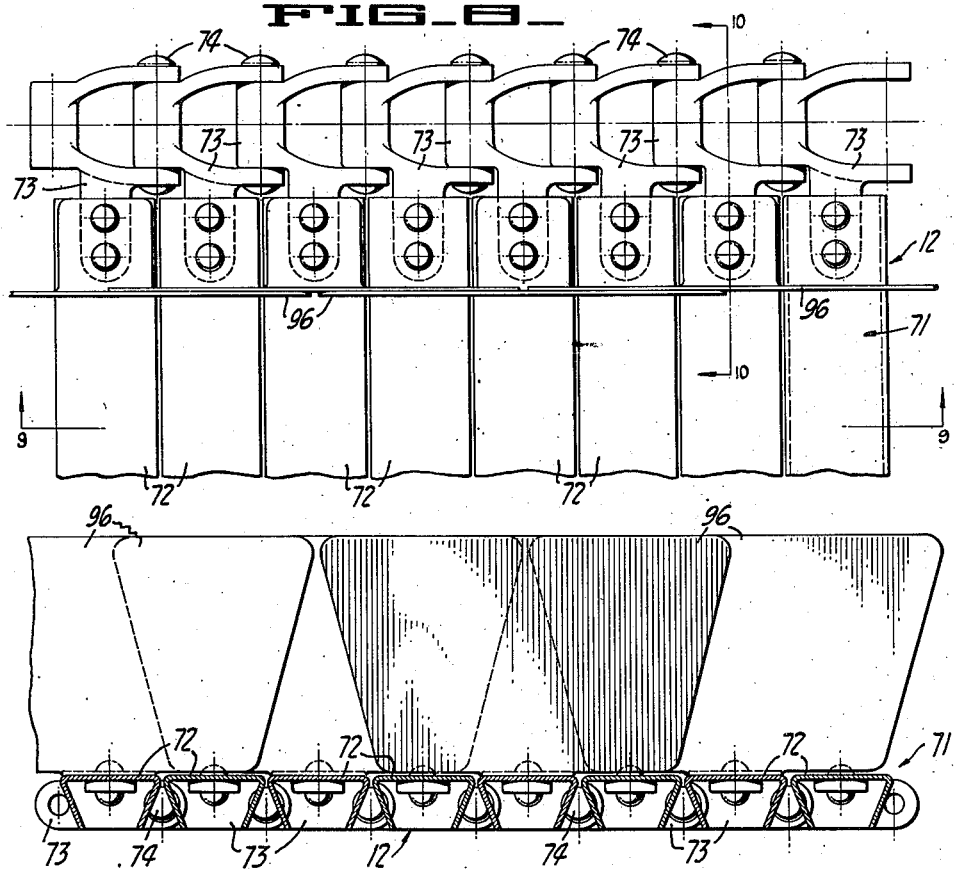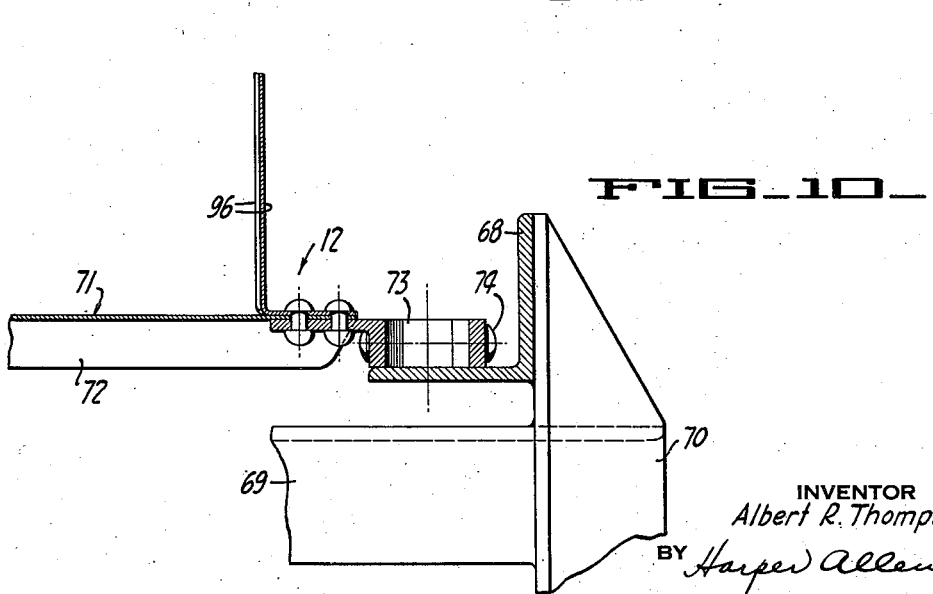

Patented Nov. 20, 1945

2,389,330

UNITED STATES PATENT OFFICE 2,389,330

VALVE MECHANISM FOR PRESSURE COOKERS

Albert R. Thompson, Los Gatos, Calif., assignor to Food Machinery Corporation, San Jose, Calif., a corporation of Delaware Application April 20, 1942, Serial No. 439,738

11 Claims. (Cl. 198—211)

This invention relates to pressure cookers and is concerned more particularly with the provision of an improved pressure cooker adapted for use in the processing of dried fruit such as prunes.

It is a general object of the invention to provide a pressure cooker for use in treating or processing dried prunes wherein the prunes are subjected to steam under pressure for a desired interval of time.

Another object of the invention is to provide a pressure cooker of the character referred to having a desirable valve mechanism for introducing and discharging the prunes from the pressure cooker.

Another object of the invention is to provide a pressure cooker of the character referred to which is constructed to avoid gumming or sticking of the parts because of the sticky character of the fruit handled.

Another object of the invention is to provide a pressure cooker of the character referred to wherein operation of the valve mechanism and the conveyor within the cooker are all in a timed relation to insure successful handling of prunes in bulk form.

Another object of the invention is to provide an improved form of conveyor which will handle sticky fruits such as prunes without becoming gummed and without requiring frequent cleaning or servicing.

Other objects and advantages of the invention will be apparent from the following description of a preferred embodiment thereof, as illustrated in the accompanying drawings, in which:

Figure 1 is a plan view of a pressure cooker embodying the invention.

Figure 2 is a side elevational view of the cooker shown in Figure 1.

Figure 3 is a sectional view through the intake valve of the cooker taken as indicated by the line 3—3 in Figure 1.

Figure 4 is a sectional view through the discharge valve of the cooker taken as indicated by the line 4—4 in Figure 1.

Figure 5 is a transverse sectional view through the discharge valve of the cooker taken as indicated by the line 5—5 in Figure 2.

Figure 6 is a fragmentary end elevational view of the cooker.

Figure 7 is a detail taken as indicated by the line 7—7 in Figure 6.

Figure 8 is a plan view of a portion of the draper.

Figure 9 is an elevational view of the draper, the view being partially in section.

Figure 10 is a sectional view of the draper taken as indicated by the line 10—10 in Figure 8.

Referring to Figures 1 and 2, the cooker includes a casing 10 which may be supported by suitable standards 11. The casing 10 encloses a draper or conveyor indicated generally at 12 (Figure 3) to which the prunes are fed by intake valve mechanism indicated generally at 13. The discharge end of the conveyor (Figure 4) is associated with a similar discharge valve mechanism 14. The valve mechanisms 13 and 14 are similar and will be described in detail hereinafter.

The casing 10 is generally cylindrical in form and is closed at its ends by similar covers 16 (Figures 2 and 6). To detachably secure the covers in place, each cover is provided with a plurality of split brackets 17 (Figures 6 and 7), each of which is engaged by wing nut 18 threaded to a bolt 19 pivoted at 21 to the casing 10. A suitable sealing ring 23 (Figure 7) may be provided in a recessed boss 22 of each of the covers 16 to engage the casing to insure a tight joint.

Within the casing 10, a steam pipe 26 may be provided (Figure 3) to which steam under pressure may be supplied if desired with a suitable thermostat control (not shown). Suitable clean-out pipes 27 (Figures 2, 3 and 4) may be provided in the lower portion of casing 10.

At the feed end of the cooker, the casing 10 is apertured to communicate with the housing 31 of intake valve 13. Housing 31 has a suitable flange 32 which is supported upon and secured to a flanged support 33 suitably secured as by welding around an opening formed in the casing 10. The housing 31 includes a cylindrical wall 34 which receives a valve rotor 36 secured on transverse shaft 37 and having a series of transversely extending pockets 38.

The specific construction of the rotor 36 and its mounting is similar to that of the discharge valve 14 and will be described in connection with the latter valve. For the present, it is sufficient to understand that the pockets 38 successively register with a feed opening 39 and a discharge opening 41 and receive charges of prunes in a controlled manner from a timing valve 42 (Figure 3) which is in the form of a gate secured on shaft 43 and extending the full length of the pockets 38. The shaft 43 is supported by suitable bearings on a feed hopper 44 which is secured on valve housing 31. Prunes are fed to the hopper 44 by suitable feed means such as a belt or shaker conveyor (not shown) which provides a relatively constant rate of feed.

The timing valve 42 (Figure 3) operates to periodically open and close the feed opening 39 so that when a desired amount is deposited in a pocket 38, the feed of prunes is interrupted until the next pocket 38 is in position to receive prunes. This operation will be described in detail later.

To drive the timing valve 42, the shaft 43 carries an arm 46 (Figures 1, 2 and 3) which is connected by an adjustable link 47 with a drive disc 48 secured on shaft 49 suitably supported on housing 31.

Shaft 49 (Figure 3) carries a pinion 51 meshing with a large gear 52 secured on shaft 37 and forming the drive gear for the valve rotor. Gear 52 which meshes with a pinion 53 on shaft 54 which carries a worm gear 56 meshing with a suitable worm 57 on shaft 58 (Figure 1). Shaft 58 carries a pulley 59 which is driven preferably from a variable speed motor (not shown).

From the above description it will be seen that the valve 36 and drive disc 48 for the timing valve 42 are driven in a timed relation to each other and the timing is such that the timing valve 42 will operate once for each pocket 38. The parts are shown in Figure 3 at the beginning of the stroke of the timing valve 42 which first travels slowly and just ahead of the rear wall of the adjacent pocket 38 and then more speedily until it approaches its closing position when it will slow down as it cuts off the flow of prunes. The flow of prunes is cut off before the rear wall a of the pocket reaches the section 35 of the cylindrical wall to the right of the feed opening 39. Wall section 35 is of sufficient length so that the pocket engaged therewith is closed from both the feed and the discharge passages to maintain the pressure within the cooker.

Discharge of the prunes from the pockets 38 is facilitated by a recessed portion 61 in housing 31 whose height is such with respect to the shape of the pocket 38 that no prunes will contact the wall 35 before the leading edge of the pocket reaches the recessed portion 61.

The prunes from the feed pockets 38 are discharged onto the conveyor or draper 12. The draper assembly 12 is constructed as a unit and is preferably removably mounted within the housing so as to be readily installed and withdrawn therefrom as necessary for repair or cleaning. For this purpose, the casing 10 may be provided with opposite parallel tracks 66 (Figures 3 to 5) in the form of inverted channel irons mounted on suitable brackets 67 and secured thereon as by welding. The draper frame includes longitudinal angles 68 which are connected by suitable cross angles 69 and upright angles 70.

Mounted for movement on the draper frame is a draper 71 which comprises a series of substantially U-shaped cross bars 72 (Figures 8 and 9). Each cross bar 72 has its ends riveted to respective links 73 of a pair of opposite chains. Adjacent links 73 of each chain are joined by a pivotal connecting pin 74. The bars 72 are connected at a central point intermediate the adjacent pivots 74 of the chain so that the space between a pair of adjacent bars 72 coincides with the pivotal axis of the pins 74 for the chain links 73 to which such bars are connected. The flanges of the U-shaped bars 72 are preferably converging as shown in Figure 9 so that the bars can move around the curved paths at the ends of the draper without interference.

The drive chains (Figure 3) are engaged at one end by a pair of idler sprockets 75 journalled in suitable bearings 76 adjustably mounted in guides 77 on the draper frame. The drive chains are engaged at their drive end by drive sprockets 81 (Figures 4 and 5) secured on shaft 82 journalled in suitable bearings 83 on the draper frame. As seen in Figure 5, shaft 82 has an endwise releasable drive coupling 84 with a stub-drive shaft 86 suitably journalled in a bearing 87 removably secured on the casing 10. Shaft 86 carries a sprocket 88 which is driven through chain 89 from a sprocket 91 on shaft 92 referred to hereinafter.

Because of the releasable drive coupling 84, the draper can be removed from the casing by removing the bearing 87 with the shaft 86 after which the entire draper assembly can be withdrawn endwise from the casing.

Means are provided for confining the fruit to the width of the draper as it is carried thereby. For this purpose, alternate links 73 of the chain each carry a wing 96 (Figures 8, 9 and 10) which converge from the top downwardly as seen in Figure 9. The bottom portion of each wing extends across the two adjacent bars 72 so that as the bars pass around the sprockets at the ends of the draper, the unfolding of the wings 96 still presents a solid wall to prevent sidewise falling of the fruit from the conveyor. This condition is seen in Figure 4.

From the conveyor, the prunes are discharged through a discharge hopper 101 (Figure 4) which has its side walls cut away to conform to the end of the draper with flared portions 101a to receive and guide the wings 96. Timing valve or gate 103 is provided in hopper 101 which is similar to timing valve 42. Guard 102 is mounted at the open side of hopper 101. Timing valve 103 is secured on shaft 104 having its bearings 106 carried by the side walls of the hopper 101. Shaft 104 carries an arm 107 which is pivotally connected to an adjustable link 108 having its other end pivotally secured to a drive disc 109 on shaft 111. Shaft 111 is carried by suitable brackets on the housing 112 of the discharge valve.

Shaft 111 (Figure 4) carries a pinion 113 which meshes with a large gear 114 (Figures 4 and 5) on shaft 92. Gear 114 meshes with a drive pinion 116 on shaft 117 which carries a worm wheel 118 driven from worm 119 on shaft 58.

Arranged to receive prunes from the timing valve 103 is a rotor or discharge valve 121 secured on shaft 92, shaft 92 being journalled in sealed bearings 122 of housing 112. Valve 121 is provided with a series of pockets 123 formed between radial walls 124 and end walls 126 of the rotor which are transversely slotted to receive a pair of sealing vanes 127 and 128. As seen in Figure 5, a plurality of compression springs 129 are disposed within the slotted walls 124 behind the inner vane whose ends are cut away to conform to the contour of the slot. Pressure from the springs 129 is transmitted to the outer vane 128 whose ends extend into openings in end walls 126 and ride on tracks 131 provided in housing 112. A suitable lateral seal ring 132 of conventional split construction is provided at each side of the rotor at the ends of vanes 128. Each ring 132 is held against rotation with the rotor by plug 135 having a pilot portion removably engaging an aperture in the ring. Each ring 132 is urged against rotor 121 adjacent the upper portions thereof by springs 130 seated in suitable recesses in the housing. Against its lower portion ring 132 is engaged by springs 130 seated in screw plugs 135a. Thus the space within the casing is sealed against escape of pressure through the feed opening 134, past the rotor and to discharge opening 133. Plug 135 when removed provides for endwise withdrawal of vanes 128. Intake valve 13 is similarly constructed.

The housing 112 (Figure 4) is provided with a cylindrical wall portion 136 over which the vanes travel in passing from the discharge to the feeding opening and a cylindrical wall portion 137 over which they travel in passing from the feed opening 134 toward a recessed portion 138 of the housing. Recessed portion 138 provides an initial space for discharge of the prunes from the pockets so that the prunes do not contact any of the wall space over which the vanes 128 must travel in sealing relation. This relationship is true in both the intake and discharge valves which is similarly constructed.

In operation, prunes are fed in a substantially constant manner to the feed hopper 44 (Figure 3) past the intake timing valve 42 into the adjacent feed product 38 as the valve 36 rotates. The travel of the timing gate 42 is so related to the adjacent feed pocket that it always travels in front of the trailing wall a of the adjacent pocket until the gate reaches the position shown in dotted lines in Figure 3, where its lower edge is still spaced slightly from the adjacent wall of hopper 44 to prevent further flow of prunes and at the same time avoid mashing of a prune caught between the gate and the hopper. The flow of prunes is cut off before the pocket is filled completely so that the wall a passes by the adjacent edge of wall portion 35 without the possibility of any prunes being caught between the wall a and the edge of wall 35.

As seen in Figure 3, the adjacent walls of the pockets 38 to the right of the feed position are both in sealing engagement with respect to wall 35 so that a seal is maintained at all times between the pressure space within the cooker and the feed opening 39. As the feed valve continues to travel, the leading wall b of a pocket will pass into registry with the recessed portion 61 of the housing before the inclination of the wall b becomes such as to cause the falling of any prunes from the pocket against the wall 35. The prunes, therefore, drop from the feed rotor on bars 72 of the draper between the wings 96. The draper carries the prunes through an atmosphere of steam under pressure for subsequent discharge from the cooker.

As seen in Figure 4, as the prunes fall from the discharge end of the draper into the hopper 101 and their entry into the pockets 123 of the discharge valve 121 is controlled by the timing valve 103 which operates in the same timed relation with respect to the pockets 123 as described in connection with the feed valve. In connection with this timing, it is especially to be noted that at its extreme left hand position the timing valve 103 will first move slowly, then be accelerated and again move slowly by virtue of the relation of its drive link 108 to the disc 109 as it travels with the leading wall of the cooperating pocket, so that there is in effect a dwell at the end of the filling operation of each pocket during which the timing valve 103 is so positioned as to prevent injury to the prunes. During this dwell, the trailing wall of the pocket passes into engagement with the wall 137 to cut off the pocket from communication and the return travel of the timing valve 103 permits the discharge of any accumulated prunes into the next oncoming pocket.

I claim:

1. A valve mechanism comprising a housing having a feed opening and a discharge opening, a valve in said housing including a pocket movable between said openings to receive and discharge fruit, a gate movable to open and closed position for controlling the feed of fruit to the pocket through said feed opening, and means for opening the gate to admit fruit to the pocket and for subsequently closing the gate ahead of the trailing edge of the pocket to interrupt the flow of fruit to the pocket before the same leaves the feed opening.

2. A valve mechanism comprising a housing having a feed opening and a discharge opening, a valve in said housing including a pocket movable between said openings to receive and discharge fruit, a gate movable to open and closed position for controlling the feed of fruit to the pocket through said feed opening, said gate having a portion movable to interrupt the flow of fruit through said feed opening, and means for opening the gate to admit fruit to the pocket and for subsequently closing the gate ahead of the trailing edge of the pocket to interrupt the flow of fruit to the pocket before the same leaves the feed opening, said gate opening means including means for effecting a dwell in the operation of the gate in its closed position.

3. A valve mechanism comprising a housing having a feed opening and a discharge opening, a valve in said housing including a pocket movable between said openings to receive and discharge fruit, means for operating said valve to cause a timed movement of said valve between said openings, a gate for controlling the feed of fruit to said pocket through said feed opening, said gate being pivoted at one side of said feed opening to swing across and close said feed opening, and means for operating said gate in time with the movement of said pocket to swing said gate across said feed opening ahead of the trailing edge of said pocket and to interrupt the flow of fruit before said pocket leaves said feed opening.

4. A valve mechanism comprising a rotary member having a series of pockets mounted for successive movement past respective fruit feeding and fruit discharging openings, and means for controlling the feed of fruit to each of said pockets by interrupting the flow of fruit into a pocket as it is leaving the fruit receiving position, said last named means including a gate having a portion movable to close said feed opening, and means for operating said gate in time with said rotary valve member to move said gate portion across said feed opening ahead of the trailing edge of the cooperating pocket to close said feed opening before said trailing edge passes from beneath said feed opening.

5. A valve mechanism comprising a rotary member having a series of pockets mounted for successive movement past a fruit receiving position to a fruit discharging position, a feed passage leading to said fruit receiving position, and means for controlling the feed of fruit to each of said pockets by interrupting the flow of fruit into a pocket as it is leaving the fruit receiving position, said last named means including a gate for opening and closing the feed passage to said pockets, and means for operating said gate in time with said rotary valve member to move the gate across said feed passage ahead of the trailing edge of the cooperating pocket to close the feed passage before said trailing edge passes from beneath said feed passage, said operating means effecting a dwell in the operation of said gate when positioned in passage closing position.

6. A valve mechanism comprising a rotary member having a series of pockets mounted for successive movement past a fruit receiving position to a fruit discharging position, a feed passage leading to said fruit receiving position, and means for controlling the feed of fruit to each of said pockets by interrupting the flow of fruit into a pocket as it is leaving the fruit receiving position, said last named means including a gate for opening and closing the feed passage to said pockets, means mounting said gate in depending relation from an axis at one side of said feed passage, means for operating said gate in time with said rotary valve member to swing the gate about said axis with its lower edge traveling across said feed passage ahead of the trailing edge of the cooperating pocket to close the feed passage before said trailing edge passes from beneath said feed passage.

7. A valve mechanism comprising a housing having a feed opening at the top and a discharge opening at the bottom thereof, and a valve within said housing having a pocket for carrying fruit from said feed opening to said discharge opening, said housing having a wall section leading from said feed opening toward said discharge opening, and a wall portion spaced from said valve extending upwardly from said discharge opening toward said wall section and joining the same at a point above the beginning of discharge from said valve pocket.

8. A valve mechanism comprising a housing having an upper feed opening and a lower discharge opening, and a rotary valve in said housing having a pocket for carrying fruit from said feed opening to said discharge opening, a portion of said housing being spaced from said valve forming a discharge passage leading to said discharge opening from a point in the travel of said valve pocket toward said discharge opening where the leading edge of the pocket resists falling of fruit from said pocket.

9. A valve mechanism comprising a housing having a cylindrical wall provided with a feed opening at the top and a discharge opening at the bottom thereof, and a rotary valve in said housing having a pocket for carrying fruit from the feed opening to the discharge opening, a portion of said wall intermediate said feed and discharge openings being spaced from the periphery of the valve and tangentially disposed thereto forming a discharge passage leading to said discharge opening from a point in the travel of said travel pocket toward said discharge opening where the leading edge of the pocket prevents falling of fruit from the pocket.

10. A valve mechanism comprising a housing having a cylindrical wall provided with an upper feed opening and a lower discharge opening, a rotary valve in said housing having radial partitions in pressure tight contact with said cylindrical wall and defining a pocket therebetween for carrying fruit from the feed opening to the discharge opening, a portion of said wall leading from said discharge opening toward said feed opening being spaced from said radial partitions forming a passage terminating at a point in the travel of said valve pocket where the leading edge of the pocket prevents falling of fruit from the pocket, the remaining cylindrical wall portion between said passage and feed opening extending around the valve for at least the spacing of said radial partitions.

11. A valve mechanism comprising a housing having a feed opening and a discharge opening, a valve in said housing including a pocket movable between said openings to receive and discharge fruit, a gate movable to open and closed position for controlling the feed of fruit to the pocket through said feed opening, and means for opening the gate to admit fruit to the pocket and for subsequently closing the gate ahead of the trailing edge of the pocket to interrupt the flow of fruit to the pocket before the same leaves the feed opening, a portion of said housing being spaced from said valve forming a discharge passage leading to said discharge opening from a point in the travel of the pocket of the valve toward the discharge opening where the leading edge of the pocket prevents falling of fruit from said pocket.

ALBERT R. THOMPSON.